United States Patent
Shi et al.

(10) Patent No.: US 11,984,120 B2
(45) Date of Patent: May 14, 2024

(54) VOICE CONTROL METHOD FOR APPLET AND DEVICE, AND STORAGE MEDIUM

(71) Applicant: BEIJING BAIDU NETCOM SCIENCE TECHNOLOGY CO., LTD., Beijing (CN)

(72) Inventors: Nansheng Shi, Beijing (CN); Malin Xie, Beijing (CN); Linfeng Ji, Beijing (CN); Jiao Cao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 449 days.

(21) Appl. No.: 17/357,660

(22) Filed: Jun. 24, 2021

(65) Prior Publication Data
US 2021/0327426 A1   Oct. 21, 2021

Related U.S. Application Data

(63) Continuation of application No. PCT/CN2020/117498, filed on Sep. 24, 2020.

(30) Foreign Application Priority Data

Jun. 29, 2020 (CN) .......................... 202010605375.6

(51) Int. Cl.
*G10L 15/22* (2006.01)
*G06F 9/30* (2018.01)

(52) U.S. Cl.
CPC ............ *G10L 15/22* (2013.01); *G06F 9/3009* (2013.01); *G10L 2015/223* (2013.01)

(58) Field of Classification Search
CPC .. G10L 15/22; G10L 2015/223; G06F 9/3009
See application file for complete search history.

(56) References Cited

U.S. PATENT DOCUMENTS

| 10,127,908 B1 | 11/2018 | Deller |
| 2007/0286360 A1 | 12/2007 | Chu |

(Continued)

FOREIGN PATENT DOCUMENTS

| CN | 106297782 A | 1/2017 |
| CN | 107251086 A | 10/2017 |

(Continued)

OTHER PUBLICATIONS

The International Search Report of PCT/CN2020/117498.

(Continued)

*Primary Examiner* — Ibrahim Siddo
(74) *Attorney, Agent, or Firm* — J.C. PATENTS

(57) ABSTRACT

The present application discloses a voice control method for applets and a device, and a storage medium, relating to a voice technology in computer technologies, specific implementations being: a voice control instruction for a target applet in an intelligent voice device from a user is acquired through a voice collecting device; voice recognition and intention analysis are performed by a voice interaction system on the voice control instruction to acquire intention information, and the intention information is transmitted to a target applet; the intention information is received and converted into a control instruction executable by a thread of the target applet by the target applet, and the control instruction is executed by the thread of the target applet.

18 Claims, 5 Drawing Sheets

(56) References Cited

U.S. PATENT DOCUMENTS

| | | | |
|---|---|---|---|
| 2014/0136215 A1 | 5/2014 | Dai | |
| 2019/0179610 A1* | 6/2019 | Aiken | H04L 12/282 |
| 2019/0221209 A1* | 7/2019 | Bulpin | G10L 15/22 |
| 2020/0005771 A1 | 1/2020 | Du | |

FOREIGN PATENT DOCUMENTS

| | | |
|---|---|---|
| CN | 108470566 A | 8/2018 |
| CN | 108632140 A | 10/2018 |
| CN | 108733438 A | 11/2018 |
| CN | 109036396 A | 12/2018 |
| CN | 110060679 A | 7/2019 |
| CN | 110309006 A | 10/2019 |
| CN | 110580904 A | 12/2019 |
| CN | 110647305 A | 1/2020 |
| CN | 110659013 A | 1/2020 |
| CN | 110718221 A | 1/2020 |
| CN | 110797022 A | 2/2020 |
| CN | 111145755 A | 5/2020 |
| JP | H10222337 A | 8/1998 |
| JP | 2002351652 A | 12/2002 |
| JP | 2005251167 A | 9/2005 |
| JP | 2013174644 A | 9/2013 |
| JP | 2017527844 A | 9/2017 |
| JP | 2018509672 A | 4/2018 |
| JP | 2020004376 A | 1/2020 |
| KR | 20170102289 A | 9/2017 |
| WO | WO2016108828 A1 | 7/2016 |
| WO | WO2018032126 A1 | 2/2018 |
| WO | WO2018102980 A1 | 6/2018 |

OTHER PUBLICATIONS

First Office Action of the priority application CN202010605375.6.
"Smart home system based on wechat control", by Zhiyu Wang, Maste's Thesis, Heilongjiang University, China, Apr. 22, 2019.
"Speech recognition over the Internet using Java", ICASSP99, by Zhemin Tu, Mar. 19, 1999.
Notice of Allowance of the priority application CN202010605375.6.
First Office Action of the parallel application JP2022-520806.

* cited by examiner

VOICE CONTROL METHOD FOR APPLET AND DEVICE, AND STORAGE MEDIUM

CROSS-REFERENCE TO RELATED APPLICATIONS

The present application is a continuation of International Application No. PCT/CN2020/117498, filed on Sep. 24, 2020, which claims priority to Chinese patent application No. 202010605375.6, filed on Jun. 29, 2020. The disclosures of the aforementioned applications are hereby incorporated by reference in their entireties.

TECHNICAL FIELD

The present application relates to a voice technology in computer technologies, and in particular, to a voice control method for applets, a device, and a storage medium.

BACKGROUND

With rapid developments of artificial intelligence and applets, more and more attention is being paid to various applications and products around applets in intelligent software and hardware devices. Various intelligent hardware products provide more services to users by embedding and distributing applets.

At present, many intelligent voice devices that support voice interaction, such as screen-attached speakers and vehicle-mounted screens, can also use applets, but distributions of the applets mainly depend on manually calling up, and interaction processes between users and applets are mainly through manually touching, for example, information video applets on screen-attached speakers need to be selected by triggering an applet center before being called up, and can be browsed and viewed by manually turning pages up and down, clicking and playing, etc.

Existing interactive methods between intelligent voice devices and applets are inconvenient to operate, and it is inconvenient to interact with a touching method especially for intelligent hardware devices such as vehicle-mounted screens and television screens, and in particular, operations to vehicle-mounted applications during driving may lead to potential safety hazards; and touching operations on screens lead to unsustainable voice interaction, resulting in attention separation, and separation of user interaction operations and inconvenience of use are easy to cause users to quit or abandon halfway; and processes are too long, for example, finding a favorite applet needs to go through the applet center before entering, which leads to poor user experience based on above factors.

SUMMARY

The present application provides a voice control method for applets and a device, and a storage medium, so as to realize voice control of applets on an intelligent voice device, improve convenience of interaction between a user and an applet, thereby improving interaction experience.

According to a first aspect of the present application, there is provided a voice control method for applets, the method being applied to an intelligent voice device, where the intelligent voice device is configured with a voice interaction system and a target applet, and the method includes:

receiving, by the target applet, intention information transmitted by the voice interaction system, where the intention information is obtained after the voice interaction system performs voice recognition and intention analysis on a voice control instruction for the target applet sent by the user; and converting, by the target applet, the intention information into a control instruction executable by a thread of the target applet, and executing, by the thread of the target applet, the control instruction.

According to a second aspect of the present application, there is provided a voice control method for applets, the method being applied to an intelligent voice device, where the intelligent voice device is configured with a voice interaction system and a target applet, and the method includes:

acquiring, by the voice interaction system, a voice control instruction for the target applet sent by a user;

performing, by the voice interaction system, voice recognition and intention analysis on the voice control instruction to acquire intention information; and transmitting, by the voice interaction system, the intention information to the target applet, to enable the target applet to convert the intention information into a control instruction executable by a thread of the target applet, and execute the control instruction.

According to a third aspect of the present application, there is provided a voice control method for applets, the method being applied to an intelligent voice device, where the intelligent voice device is configured with a voice interaction system and a target applet, and the method includes:

acquiring, through a voice collecting device, a voice control instruction for the target applet in the intelligent voice device from a user;

performing, by the voice interaction system, voice recognition and intention analysis on the voice control instruction to acquire intention information, and transmitting the intention information to the target applet; and receiving, by the target applet, the intention information, and converting the intention information into a control instruction executable by a thread of the target applet, and executing, by the thread of the target applet, the control instruction.

According to a fourth aspect of the present application, there is provided an intelligent voice device on which a voice interaction system and a target applet are configured; where the voice interaction system includes:

an acquiring module, configured to acquire, through a voice collecting device, a voice control instruction for the target applet from a user in the intelligent voice device;

a voice processing module, configured to perform voice recognition and intention analysis on the voice control instruction to acquire intention information, and transmit the intention information to the target applet;

where the target applet includes:

a receiving module, configured to receive the intention information;

an instruction converting module, configured to convert the intention information into a control instruction executable by a thread of the target applet; and an executing module, configured to execute the control instruction through the thread of the target applet.

According to a fifth aspect of the present application, there is provided an electronic device, including:

at least one processor; and a memory communicatively connected to the at least one processor; where, the memory stores instructions executable by the at least one processor, the instructions being executed by the at least one processor to cause the at least one processor to execute the method according to the first aspect or the second aspect or the third aspect.

According to a sixth aspect of the present application, there is provided a non-transitory computer-readable storage medium storing computer instructions, where the computer instructions are used to cause a computer to execute the method according to the first aspect or the second aspect or the third aspect.

According to the voice control method for applets, the device and the storage medium provided by the embodiments of the present application, a voice control instruction for a target applet in an intelligent voice device from a user is acquired through a voice collecting device; voice recognition and intention analysis are performed by the voice interaction system on the voice control instruction to acquire intention information, and the intention information is transmitted to a target applet; the intention information is received and converted into a control instruction executable by a thread of the target applet by the target applet, and the control instruction is executed by the thread of the target applet. According to the embodiments of the present application, through interactions between the voice interaction system and a target applet framework, voice control to the target applet can be implemented, thereby improving convenience of an interaction process, and avoiding attention separation caused by unsustainable voice interaction which is due to the fact that the interaction with the applet needs to be performed in a touching manner, improving user experience of using the applet, and providing a strong support for distribution and usage of the applet in the intelligent voice device.

It should be understood that contents described in this section is not intended to identify key or important features of embodiments of the present application, nor is it intended to limit a scope of the present application. Other features of the present application will become apparent from the following description.

BRIEF DESCRIPTION OF DRAWINGS

Accompanying drawings are for better understanding of the present solution, but not to limit the present application. Where.

DESCRIPTION OF EMBODIMENTS

Exemplary embodiments of the present application are described below with reference to the accompanying drawings, including various details of the embodiments of the present application to facilitate understanding, which should be considered as merely exemplary. Therefore, it should be recognized by those of ordinary skills in the art that various changes and modifications can be made to the embodiments described herein without departing from the scope and spirit of the present application. Also, for the sake of clarity and brevity, descriptions of well-known functions and structures are omitted in the following description.

Distributions of applets of intelligent voice devices in prior art, especially some intelligent voice devices with screens, such as screen-attached speakers and vehicle-mounted screens, mainly depend on manual calling, and interaction processes between users and applets are mainly through manual touch interactions, for example, information video applets on screen-attached speakers need to be selected by triggering an applet center before being called up, and can be browsed and viewed by manually turning pages up and down, clicking and playing, etc. Existing interactive methods between intelligent voice devices and applets are inconvenient to operate, and it is inconvenient to interact with a touching method especially for intelligent hardware devices such as vehicle-mounted screens and television screens, and in particular, operations to vehicle-mounted applications during driving may lead to potential safety hazards; and touching operations on screens lead to unsustainable voice interaction, resulting in attention separation, and separation of user interaction operations and inconvenience of use are easy to cause users to quit or abandon halfway; and processes are too long, for example, finding a favorite applet needs to go through the applet center before entering, which leads to poor user experience based on above factors.

Aiming at the above-mentioned technical problems in the prior art, the present application provides a voice control method for applets applied in a voice technology in computer technologies, through interactions between the voice interaction system and an applet framework, voice control to the target applet can be implemented, thereby improving convenience of an interaction process, and avoiding attention separation caused by unsustainable voice interaction which is due to the fact that the interaction with the applet needs to be performed in a touching manner, improving user experience of using the applet, and providing a strong support for distribution and usage of the applet in intelligent voice devices. The present application can be applied to intelligent voice devices with screens, and of course can also be applied to intelligent voice devices without screens. Of course, the applet can still have a function of being called up and controlled by manually touching.

Figure 1:
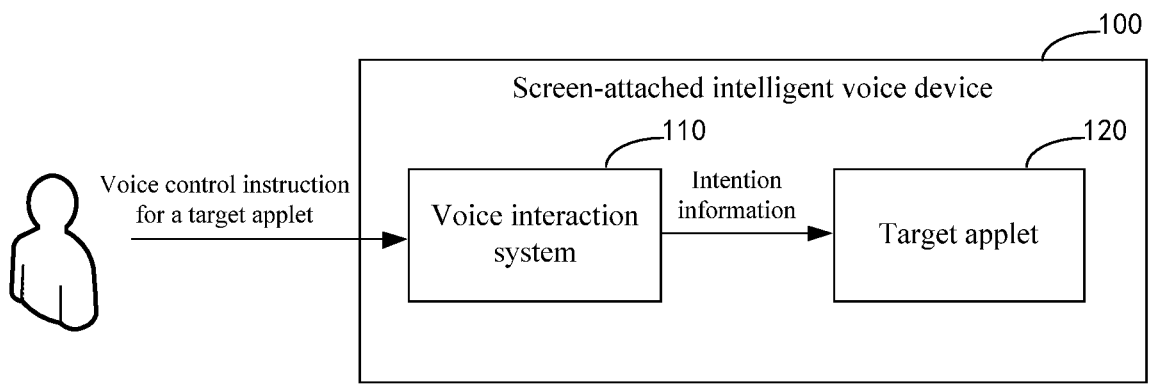
FIG. 1 is a scenario diagram of a voice control method for applets which can implement the embodiments of the present application.

The embodiment of the present application is applied to a scenario showed in FIG. 1, an intelligent voice device 100 is configured with a voice interaction system 110 and a target applet 120, where the voice interaction system 110 can perform voice recognition and intention analysis on voice control instructions collected by a voice collecting device and from a user for a target applet to acquire intention information, and transmit the intention information to the target applet 120, and the target applet 120 receives the intention information, and converts the intention information into a control instruction executable by a thread of the target applet 120, and the thread of the target applet 120 executes the control instruction. Through the above-mentioned interaction between the voice interaction system 110 and a framework of the target applet 120, a voice control of the target applet can be implemented.

A voice control process for applets in the present application will be described in detail with reference to specific embodiments and accompanying drawings.

Figure 2:
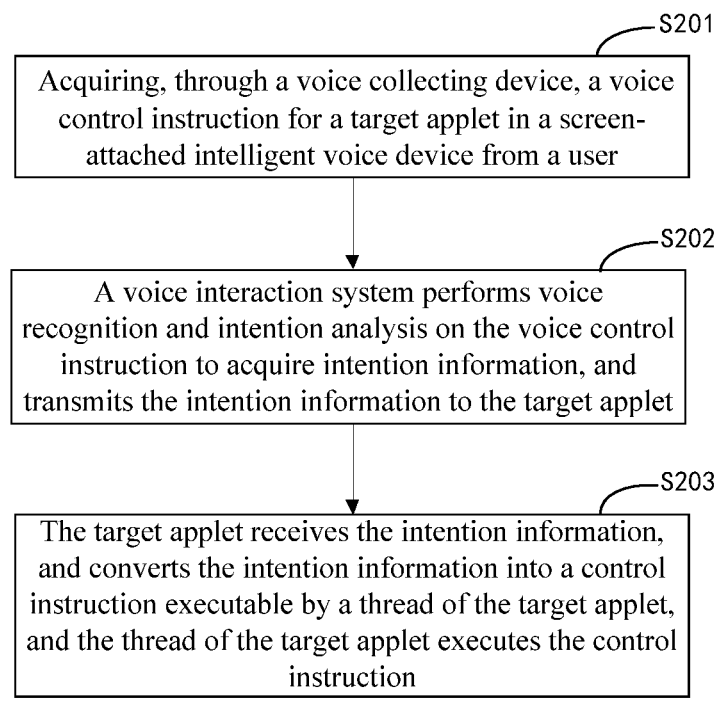
FIG. 2 is a flowchart of a voice control method for applets according to an embodiment of the present application.

An embodiment of the present application provides a voice control method for applets, FIG. 2 is a flowchart of the voice control method for applets according to an embodiment of the present application. An executive body can be an intelligent voice device, on which a voice interaction system and a target applet are configured; as shown in FIG. 2, specific steps of the voice control method for applets are as follows:

S201, acquiring, through a voice collecting device, a voice control instruction for a target applet in an intelligent voice device from a user.

In the embodiment, when the user needs to control the target applet on the intelligent voice device, a voice control instruction can be sent, for example, if the user wants to control a called up video applet A on an intelligent speaker to play a variety show B, the user can send a voice control instruction of "I want to watch variety show B in video applet A", and then the voice control instruction of the user can be collected by a voice collecting device such as a microphone on the intelligent speaker.

It can be understood that, when the user sends the voice control instruction including the video applet A and the variety show B, the video applet A and the variety show B can be a real video applet and a real variety show, which are processed to be invisible here.

S202, the voice interaction system performs voice recognition and intention analysis on the voice control instruction to acquire intention information, and transmits the intention information to the target applet.

In the embodiment, since the voice interaction system of the intelligent voice device usually has functions of voice recognition and intention analysis, after the voice collecting device collects the voice control instruction for the target applet, the voice recognition and intention analysis are performed through the voice recognition and intention analysis functions of the voice interaction system, where the voice recognition is to convert the collected voice control instruction into characters understandable by a machine, while the intention analysis is to analyze and process machine characters and to interpret key information, for example, following keywords can be resolved from the above voice control instruction, "applet", "video applet A" and "variety show B", hence, the intention information of the user is acquired; however, there is no need to deploy voice recognition and intention analysis functions in the target applet, after the voice interaction system acquires the intention information, the voice interaction system can transmit the intention information to the target applet, that is, transmit the intention information to a thread of the target applet.

S203, the target applet receives the intention information, and converts the intention information into a control instruction executable by a thread of the target applet, and the thread of the target applet executes the control instruction.

In the embodiment, since different applets may adopt different frameworks or development languages during a development process, which may be different from that of the voice interaction system, and the intention information acquired by the voice interaction system may not be understood and executed by applets. Therefore, when the target applet is called up in the intelligent voice device, after receiving the intention information transmitted by the voice interaction system, the target applet converts the intention information into a control instruction executable by a thread of the target applet, and the control instruction is further executed by the thread of the target applet, thereby implementing intention or functions required by the user. For example, a video applet A is called up on an intelligent speaker, after the video applet A receives related intention information that the user wants to play a variety show B, the intention information is converted into a search resource pool instruction and a play instruction that the video applet A can execute, and the search resource pool instruction and the play instruction are further executed to implement playing the variety show B in the video applet A.

Of course, if the target applet is not called up at present, the target applet needs to be called up by the voice interaction system before the target applet performs the above process.

According to the voice control method for applets provided by the present embodiment, a voice control instruction for a target applet in the intelligent voice device from a user is acquired through a voice collecting device; voice recognition and intention analysis are performed by the voice interaction system on the voice control instruction to acquire intention information, and the intention information is transmitted to a target applet; the intention information is received and converted into a control instruction executable by a thread of the target applet by the target applet, and the control instruction is executed by the thread of the target applet. According to the present embodiment, through interactions between the voice interaction system and a target applet framework, voice control to the target applet can be implemented, thereby improving convenience of an interaction process, and avoiding attention separation caused by unsustainable voice interaction which is due to the fact that the interaction with the applet needs to be performed in a touching manner, improving user experience of using the applet, and providing a strong support for distribution and usage of the applet in the intelligent voice device.

On the basis of any of the above embodiments, when the voice interaction system acquires the intention information as described in S202, the method may specifically include:

the voice interaction system generates the intention information in accordance with a preset protocol according to an intention analysis result;

correspondingly, when the target applet converts the intention information into a control instruction executable by a thread of the target applet as described in the S203, the method may specifically include:

the target applet determines a preset converting rule according to the intention information, and converts the intention information into the control instruction executable by the thread of the target applet according to the preset converting rule.

In the embodiment, after acquiring an intention analysis result, the voice interaction system can convert the intention analysis result into the intention information satisfying the preset protocol according to the preset protocol, where the preset protocol can specifically include a protocol header and a content part of the protocol, where the protocol header can specifically include but not limited to a namespace of an instruction, a name of the instruction and an encryption type (if the system embeds a protocol, encryption transmission is not required), and the content part of the protocol can include but not limited to operation information corresponding to the intention and target applet information, where the operation information can include but not limited to an operation type and extension information, the extension information can supplement the operation type, and the target applet information can include an applet identifier of the target applet; for example, if the user intends to fast forward a video currently played by the video applet A, the operation type is "fast forward", the applet identifier is an identifier of the video applet A, and the extension information is a fast forward speed, such as 2 times fast forward speed.

Furthermore, after receiving the intention information that satisfies the preset protocol transmitted by the voice interaction system, the target applet converts the intention information into a control instruction executable by the target applet, for example, the target applet is of a SwanJS (Smart Web Application Native JavaScript) architecture, and the SwanJS is a core of applet frameworks of an Internet enterprise, so the intention information that satisfies the preset protocol needs to be converted into a SwanJS event command. Optionally, during instruction conversion, the target applet acquires a preset conversion rule corresponding to the protocol header according to the protocol header in the intention information, where the preset conversion rule includes a corresponding relationship between the preset operation information and the preset control instruction; according to the corresponding relationship between the preset operation information and the preset control instruction, the target applet converts the content part of the protocol in the intention information into the control instruction executable by the thread of the target applet.

Furthermore, firstly, according to conversion rules corresponding to the namespace in the protocol header, the agreed instruction space is analyzed, and it can be determined whether the intention information is aimed at the target applet according to an instruction space, an operation type, an encryption type, an applet identifier, etc., if not, it is determined that the intention information is invalid for the target applet, and return directly, so that a subsequent voice control process is not carried out, the applet thread needs not to be occupied, and a running overhead is reduced, and if yes, the subsequent voice control process can be continued; and the content part of the protocol is a part that needs to be executed by the control instruction, event calling up of a developer application program is supported, the content part of the protocol can be converted into the control instruction under a SwanJS framework according to the conversion rule, for example, all control instructions executable in the target applet, and a corresponding relationship between respective preset control instructions and preset operation types can be preset, hence, which control instruction corresponds to the content part of the protocol is determined.

In the embodiment, considering a diversity of applet adaptation and implementation, SwanJS only implements a general function of an interface, and for a mode of specific applet and specific scenario, a developer can rewrite an instruction execution function through the interface. For example, for a fast forwarding control instruction, SwanJS only provides an interface to implement a general function of fast forwarding, and in which way the fast forwarding is performed can be configured by the developer according to the specific scenario.

Figure 3:
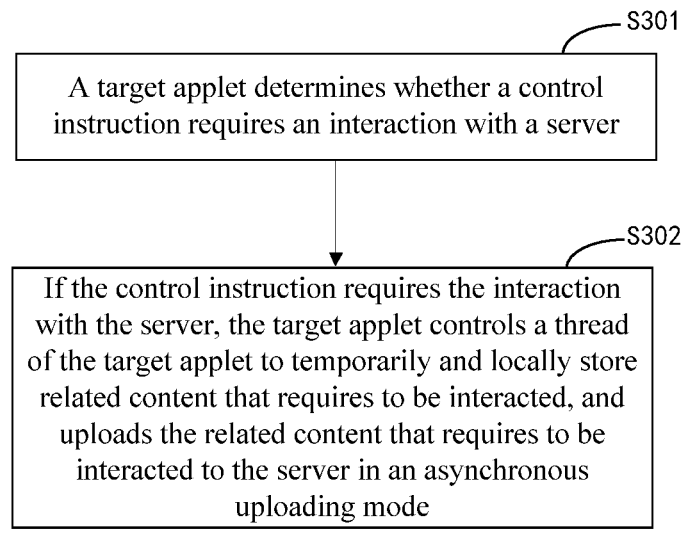
FIG. 3 is a flowchart of a voice control method for applets according to another embodiment of the present application.

On the basis of any of the above embodiments, as shown in FIG. 3, when the control instruction is executed by the thread of the target applet in S203, the method may further specifically includes:

S301, the target applet determines whether the control instruction requires an interaction with a server; and S302, if the control instruction requires the interaction with the server, the target applet controls the thread of the target applet to temporarily and locally store related content that requires to be interacted, and uploads the related content that requires to be interacted to the server in an asynchronous uploading mode.

In the present embodiment, considering when the intelligent voice device is in a weak or disconnected network environment, some control instructions that require interactions with the server do not require interactions with the server immediately, and an instruction scheduling process is carried out through the target applet, related content that requires to be interacted with the server in the target applet are temporarily and locally stored in the intelligent voice device, and the related content is uploaded to the server in an asynchronous method, for example, when the intelligent voice device is in a weak or disconnected network environment, a control instruction is to collect a video, a video to be collected needs to be recorded in the server, to enable that when the target applet is called up next time or the applet is called up in other devices, the user can still see the collected video, the target applet can temporarily and locally store the related content of the collected video, and upload asynchronously, for example, upload to the server when the network environment is good, or wait for an idle period silently and upload to the server, thus avoiding frequent interactions between the target applet and the server during the user interaction, ensuring a sufficient bandwidth during the user interaction and improving user experience.

Of course, in the above embodiment, when the control instruction that requires an interaction with the server is received when the network environment is good, a synchronous uploading manner can also be adopted. In addition, in the embodiment, asynchronous and synchronous uploading are compatible, which can be selected according to specific scenarios such as network environment. Optionally, after the control instruction is received, whether an interaction with the server is needed is determined, when the interaction is not needed, the control instruction can be executed locally; when the interaction is needed, it is determined whether the control instruction needs to be temporarily and locally stored, if not needing to be temporarily and locally stored, the control instruction is directly uploaded to the server, if needing to be temporarily and locally stored, the control instruction is temporarily and locally stored, and then uploaded to the server asynchronously.

Optionally, in the embodiment, for some data that needs to be synchronized to the server, asynchronous uploading can also be adopted to ensure that the same user has the same experience when using the same target applet on different devices, for example, favorites, historical browsing records, comments, likes, purchase orders and other data of the user can be viewed on the same target applet on different intelligent speakers.

Figure 4:
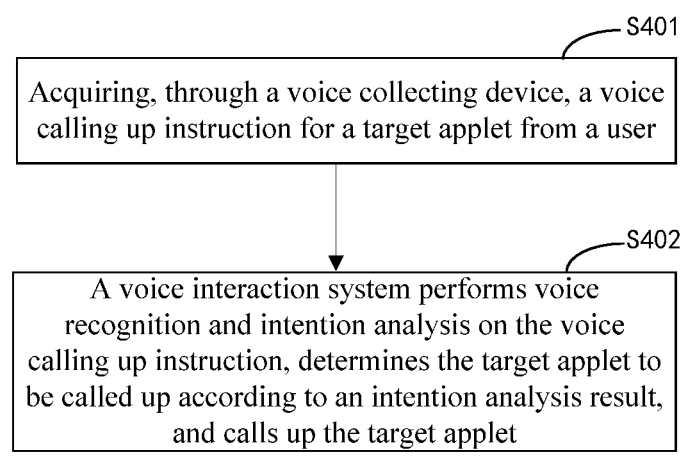
FIG. 4 is a flowchart of a voice control method for applets according to another embodiment of the present application.

On the basis of any one of the above-mentioned embodiments, as shown in FIG. 4, before the acquiring, through a voice collecting device, a voice control instruction for the target applet from a user in the intelligent voice device described in S201, the method may further include:

S401, acquiring, through the voice collecting device, a voice calling up instruction for the target applet from the user; and S402, the voice interaction system performs voice recognition and intention analysis on the voice calling up instruction, determines the target applet to be called up according to an intention analysis result, and calls up the target applet.

In the embodiment, since S201-S203 are voice control of the target applet after the target applet has been called up in the intelligent voice device, the target applet needs to be called up before the voice control of the target applet.

Specifically, calling up can be performed through a voice control method during a calling up process, that is, acquiring a voice calling up instruction from the user for the target applet through a voice collecting device, for example, the user sends a voice calling up instruction of "starting the video applet A", the voice recognition and intention analysis can be carried out by the voice interaction system, the intention of the user to call up the target applet "video applet A" is determined, and then the target applet can be called up.

Figure 5:
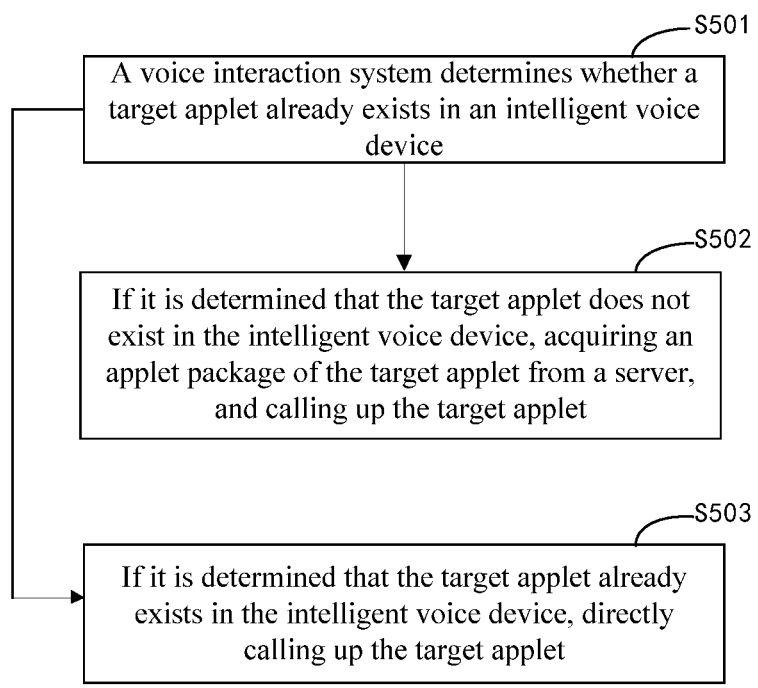
FIG. 5 is a flowchart of a voice control method for applets according to another embodiment of the present application.

On the basis of any of the above embodiments, as shown in FIG. 5, when calling up the target applet by the voice interaction system according to S402, the method may specifically include:

S501: the voice interaction system determines whether the target applet already exists in the intelligent voice device;

S502: if it is determined that the target applet does not exist in the intelligent voice device, acquiring an applet package of the target applet from a server, and calling up the target applet; or, S503: if it is determined that the target applet already exists in the intelligent voice device, directly calling up the target applet.

In the present embodiment, if the target applet has been used before and is still cached in the intelligent voice device, or if the target applet has not been used before but is cached in advance, it is not necessary to acquire the applet package of the target applet from the server, and the target applet can be directly called up; otherwise, the target applet does not exist in the intelligent voice device, then the applet package of the target applet needs to be acquired from the server, and then the target applet is called up.

Figure 6:
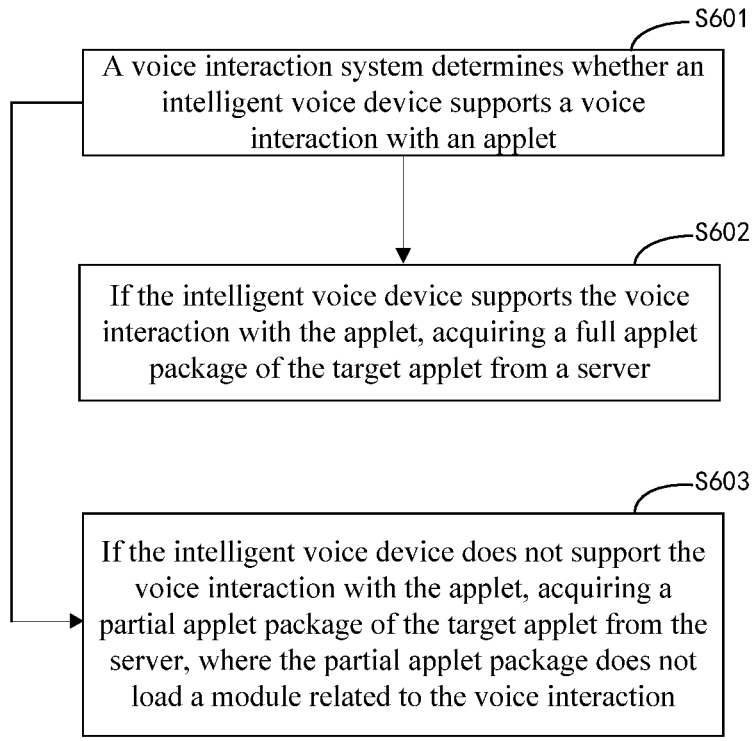
FIG. 6 is a flowchart of a voice control method for applets according to another embodiment of the present application.

Optionally, as shown in FIG. 6, when acquiring the applet package of the target applet from the server according to S502, the method may specifically include:

S601: the voice interaction system determines whether the intelligent voice device supports a voice interaction with an applet;

S602: if the intelligent voice device supports the voice interaction with the applet, acquiring a full applet package of the target applet from the server; or, S603: if the intelligent voice device does not support the voice interaction with the applet, acquiring a partial applet package of the target applet from the server, where the partial applet package does not load a module related to the voice interaction.

In the embodiment, when the voice interaction system acquires an SDK (software development kit) applet package of the target applet from the server, whether the intelligent voice device has an ability of supporting the voice interaction with the applet can be first determined, and if the intelligent voice device supports the voice interaction with the applet, a full SDK applet package of the target applet is acquired from the server; if the intelligent voice device does not support the voice interaction with the applet, a partial SDK applet package of the target applet is acquired from the server, comparing with the full SDK applet package, the partial SDK applet package does not load a module related to the voice interaction, that is, the target applet does not have an ability of receiving the intention information, and converting the intention information into the control instruction executable by the thread of the target applet, in this way, a package size of the applet is reduced, data package consumption during a loading process is reduced, and a calling up speed of the target applet is improved.

Figure 7:
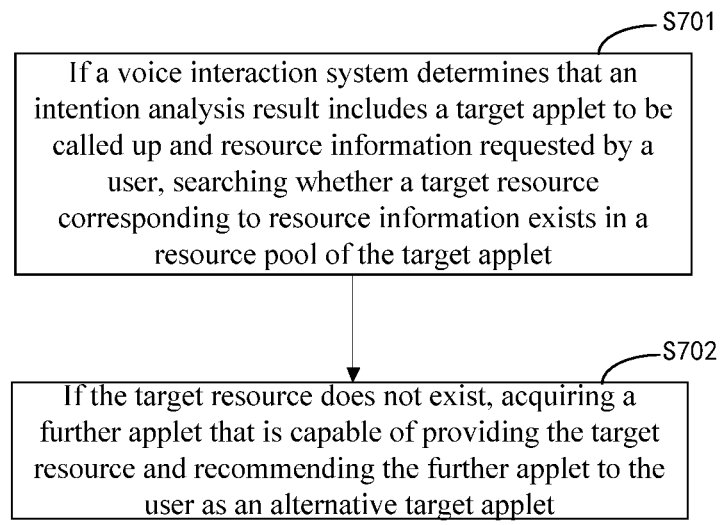
FIG. 7 is a flowchart of a voice control method for applets according to another embodiment of the present application.

On the basis of any of the above embodiments, as shown in FIG. 7, the determining the target applet to be called up according to an intention analysis result includes:

S701, if the voice interaction system determines that the intention analysis result includes the target applet to be called up and resource information requested by the user, searching whether a target resource corresponding to the resource information exists in a resource pool of the target applet; and S702, if the target resource does not exist, acquiring a further applet that is capable of providing the target resource and recommending the further applet to the user as an alternative target applet.

In the embodiment, the voice calling up instruction for the target applet sent by the user can specifically include a name of the target applet and the requested resource information, for example, in a case that the intelligent voice device does not currently call up the video applet A, when the voice instruction "I want to watch the variety show B of the video applet A" is sent by the user, at this time, the voice instruction can be considered as a non-voice calling up instruction, after voice recognition and intention analysis, it can be determined that the target applet to be called up is the video applet A, and the resource requested by the user is the variety show B, at this time, whether the resource exists in a resource pool of the video applet A can be searched in the server, and if the resource exists, the video applet A is called up, including directly calling up or calling up after acquiring the applet package; if the resource does not exist in the resource pool of the video applet A, it can be searched whether the resource exists in resource pools of other applets, for example, the resource exists in a resource pool of a video applet C, the video applet C can be recommended to the user, for example, inquiring the user whether to call up the video applet C, or directly calling up the video applet C as the target applet.

In addition, optionally, if the voice instruction sent by the user only includes a requested resource, fuzzy search can be performed according to the requested resource to determine the target applet, for example, the user sends a voice instruction of "I want to watch the variety show B", the applets where the resource exists can be searched, so as to determine the applet as the target applet and call up the applet.

On the basis of any one of the above-mentioned embodiments, the voice control method for applets may further include:

the voice interaction system periodically acquires a predetermined number of applet packages of popular applets from the server and caches the apple packages.

In the embodiment, the voice interaction system can access the server periodically to acquire related information of the popular applets, and the voice interaction system can select a predetermined number of popular applets according to the related information of the popular applets, and acquire the applet packages of these popular applets from the server for caching, so as to realize quick calling up when the user needs to call up a certain popular applet. Of course, the related information of the popular applets can also be periodically pushed by the server to the voice interaction system, and then the voice interaction system can select a predetermined number of popular applets according to the related information of popular applets. Optionally, the number of popular applets to be cached can be determined according to a storage space of the intelligent voice device; and a selection of popular applets for caching can be determined according to a download amount of applets, user interests and other factors.

According to the voice control method for applets provided by the above embodiments, voice control of target applets can be implemented through interactions between a voice interaction system and a target applet framework; in addition, when not called up, the target applet can be called up through voice control, therefore, convenience of calling up of the applet is improved, an operation process of finding and opening the applet by touching is simplified, user experience of using the applet is improved, and a strong support for distribution and usage of the applet in intelligent voice devices is provided.

An embodiment of the present application provides a voice control method for applets, which is applied to an intelligent voice device, where the intelligent voice device is configured with a voice interaction system and a target applet, the method includes:

the target applet receives intention information transmitted by the voice interaction system, where the intention information is obtained after the voice interaction system performs voice recognition and intention analysis on a voice control instruction for the target applet sent by the user; and the target applet converts the intention information into a control instruction executable by a thread of the target applet, and executing, by the thread of the target applet, the control instruction.

On the basis of the above-mentioned embodiments, where the intention information is intention information generated by the voice interaction system in accordance with a preset protocol according to an intention analysis result;

where the target applet converts the intention information into a control instruction executable by a thread of the target applet includes:

the target applet determines a preset converting rule according to the intention information, and converts the intention information into the control instruction executable by the thread of the target applet according to the preset converting rule.

On the basis of the above-mentioned embodiments, the preset protocol includes a protocol header and content of the protocol, where the content of the protocol includes operation information corresponding to the intention and target applet information;

where the target applet determines a preset converting rule according to the intention information, and converts the intention information into the control instruction executable by the thread of the target applet according to the preset converting rule includes:

the target applet obtains a preset conversion rule corresponding to the protocol header according to the protocol header in the intention information, where the preset conversion rule includes a corresponding relationship between the preset operation information and a preset control instruction; and the target applet converts, according to the corresponding relationship between the preset operation information and the preset control instruction, the content of the protocol in the intention information into the control instruction executable by the thread of the target applet.

On the basis of the above-mentioned embodiments, where the thread of the target applet executes the control instruction includes:

if the target applet determines that the control instruction requires an interaction with a server, the target applet controls the thread of the target applet to temporarily and locally store related content that requires to be interacted, and uploads the related content that requires to be interacted to the server in an asynchronous uploading mode.

On the basis of the above-mentioned embodiments, before the target applet receives the intention information transmitted by the voice interaction system, the method further includes:

the voice interaction system calls up the target applet according to a voice calling up instruction for the target applet sent by the user.

On the basis of the above embodiments, the intelligent voice device is an intelligent speaker.

The voice control method for applets provided by the present embodiment is a process executed by the target applet in the intelligent voice device in the above-mentioned embodiment, for specific implementations and technical effects thereof, reference can be made to the above-mentioned embodiments, which will not be repeated here.

An embodiment of the present application provides a voice control method for applets, which is applied to an intelligent voice device, where the intelligent voice device is configured with a voice interaction system and a target applet, the method includes:

the voice interaction system acquires a voice control instruction for the target applet sent by a user;

the voice interaction system performs voice recognition and intention analysis on the voice control instruction to acquire intention information; and the voice interaction system transmits the intention information to the target applet, to enable the target applet to convert the intention information into a control instruction executable by a thread of the target applet, and execute the control instruction.

On the basis of the above-mentioned embodiments, the acquiring the intention information includes:

the voice interaction system generates the intention information in accordance with a preset protocol according to an preset protocol, where the preset protocol includes a protocol header and content of the protocol, where the content of the protocol includes operation information corresponding to the intention and target applet information.

On the basis of the above-mentioned embodiment, before the voice interaction system acquires a voice control instruction for the target applet sent by a user, the method further includes:

the voice interaction system acquires a voice calling up instruction for the target applet sent by a user; and the voice interaction system performs voice recognition and intention analysis on the voice calling up instruction, determines the target applet to be called up according to the intention analysis result, and calls up the target applet.

On the basis of the above-mentioned embodiments, the calling up the target applet includes:

if the voice interaction system determines that the target applet does not exist in the intelligent voice device, acquiring an applet package of the target applet from a server, and calling up the target applet; or, if the voice interaction system determines that the target applet already exists in the intelligent voice device, directly calling up the target applet.

On the basis of the above-mentioned embodiments, the acquiring the applet package of the target applet from a server includes:

if the voice interaction system determines that the intelligent voice device supports a voice interaction with an applet, acquiring a full applet package of the target applet from the server; or, if the voice interaction system determines that the intelligent voice device does not support voice interaction with an applet, acquiring a partial applet package of the target applet from the server, where the partial applet package does not load a module related to the voice interaction.

On the basis of the above embodiment, the determining the target applet to be called up according to the intention analysis result includes:

if the voice interaction system determines that the intention analysis result includes the target applet to be called up and resource information requested by the user, searching whether a target resource corresponding to the resource information exists in a resource pool of the target applet;

if the target resource does not exist, acquiring a further applet that is capable of providing the target resource and recommending the further applet to the user as an alternative target applet.

On the basis of the above-mentioned embodiment, the method further includes:

the voice interaction system periodically acquires a predetermined number of applet packages of popular applets from the server and caching the apple packages.

On the basis of the above embodiments, the intelligent voice device is an intelligent speaker.

The voice control method for applets provided by the present embodiment is a process executed by the voice interaction system in the intelligent voice device in the above-mentioned embodiment, for specific implementations and technical effects thereof, reference can be made to the above-mentioned embodiments, which will not be repeated here.

Figure 8:
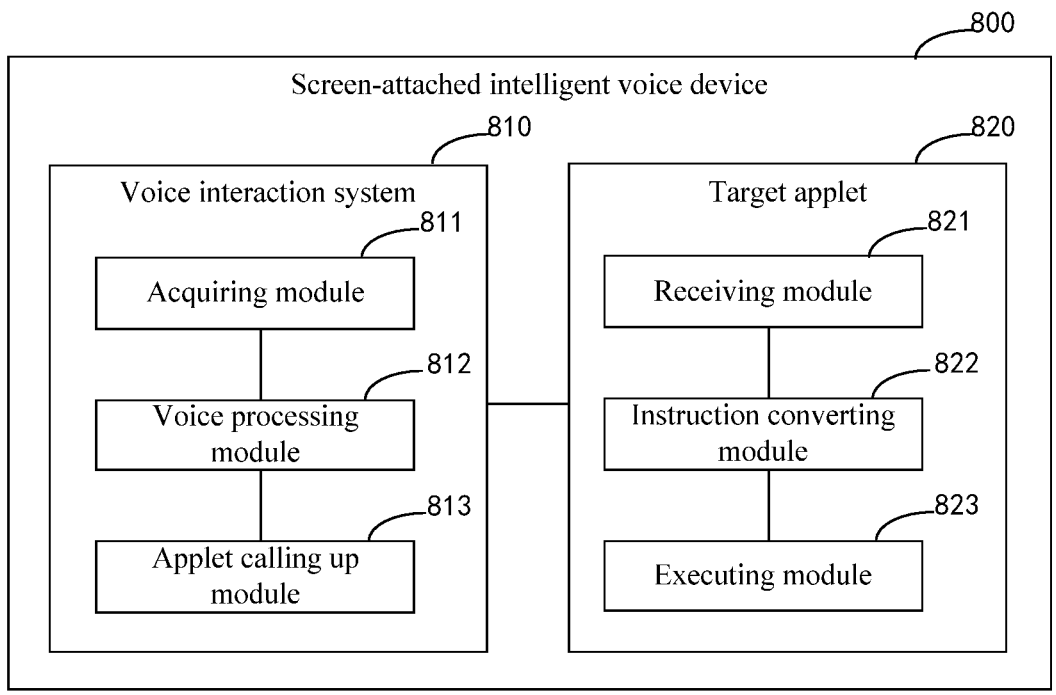
FIG. 8 is a structural diagram of an intelligent voice device according to an embodiment of the present application.

An embodiment of the present application provides an intelligent voice device, FIG. 8 is a structural diagram of an intelligent voice device according to an embodiment of the present application. As shown in FIG. 8, the intelligent voice device 800 is configured with a voice interaction system 810 and a target applet 820.

The voice interaction system 810 may include: an acquiring module 811 and a voice processing module 812;

the acquiring module 811 being configured to acquire, through a voice collecting device, a voice control instruction for the target applet from a user in the intelligent voice device;

the voice processing module 812 being configured to perform voice recognition and intention analysis on the voice control instruction to acquire intention information, and transmit the intention information to the target applet;

the voice processing module 812 may specifically include a voice recognition submodule and an intention analysis submodule.

The target applet 820 may include: a receiving module 821, an instruction converting module 822 and an executing module 823;

the receiving module 821 being configured to receive the intention information;

the instruction converting module 822 being configured to convert the intention information into a control instruction executable by a thread of the target applet; and the executing module 823 being configured to execute the control instruction through the thread of the target applet.

On the basis of any one of the above-mentioned embodiments, when acquiring the intention information, the voice processing module 812 is configured to:

generate the intention information in accordance with a preset protocol according to an intention analysis result;

when converting the intention information into the control instruction executable by the thread of the target applet, the instruction converting module 822 is configured to:

determine a preset converting rule according to the intention information, and convert the intention information into the control instruction executable by the thread of the target applet according to the preset converting rule.

On the basis of any one of the above-mentioned embodiments, when executing the control instruction through the thread of the target applet, the executing module 823 is configured to:

determine whether the control instruction requires an interaction with a server;

if the control instruction requires the interaction with the server, control the thread of the target applet to temporarily and locally store the related content that requires to be interacted, and upload the related content that requires to be interacted to the server in an asynchronous uploading mode.

That is, the executing module 823 may specifically include a scheduling submodule and an uploading submodule.

On the basis of any one of the above-mentioned embodiments, before the acquiring, through a voice collecting device, a voice control instruction for the target applet from a user in the intelligent voice device, the acquiring module 811 is further configured to: acquire a calling up instruction for the target applet from the user through the voice collecting device;

the voice interaction system 810 further includes an applet calling up module 813, which is configured to:

perform voice recognition and intention analysis on the voice calling up instruction, determine the target applet to be called up according to an intention analysis result, and call up the target applet.

On the basis of any one of the above-mentioned embodiments, when calling up the target applet, the applet calling up module 813 is configured to:

determine whether the target applet already exists in the intelligent voice device;

if it is determined that the target applet does not exist in the intelligent voice device, acquire an applet package of the target applet from a server, and call up the target applet; or, if it is determined that the target applet already exists in the intelligent voice device, directly call up the target applet.

On the basis of any one of the above-mentioned embodiments, when acquiring the applet package of the target applet from the server, the applet calling up module 813 is configured to:

determine whether the intelligent voice device supports the voice interaction with an applet;

if the intelligent voice device supports the voice interaction with the applet, acquire a full applet package of the target applet from the server; or, if the intelligent voice device does not support the voice interaction with the applet, acquire a partial applet package of the target applet from the server, where the partial applet package does not load a module related to the voice interaction.

On the basis of any one of the above embodiments, when determining the target applet to be called up according to the intention analysis result, the applet calling up module is configured to:

if it is determined that the intention analysis result includes the target applet to be called up and resource information requested by the user, search whether a target resource corresponding to the resource information exists in the resource pool of the target applet; and if the target resource does not exist, acquire a further applet that is capable of providing the target resource and recommending the further applet to the user as an alternative target applet.

On the basis of any one of the above-mentioned embodiments, the applet calling up module 813 is further configured to:

periodically acquire a predetermined number of applet packages of popular applets from the server and cache the apple packages.

The intelligent voice device provided in the present embodiment can be specifically configured to execute the method embodiments provided in the above figures, and detailed functions will not be described here.

According to the intelligent voice interaction provided by the present embodiment, a voice control instruction for a target applet in an intelligent voice device from a user is acquired through a voice collecting device; voice recognition and intention analysis are performed by the voice interaction system on the voice control instruction to acquire intention information, and the intention information is transmitted to the target applet; the intention information is received and converted into a control instruction executable by a thread of the target applet by the target applet, and the control instruction is executed by the thread of the target applet. According to the present embodiment, through interactions between the voice interaction system and a target applet framework, voice control to the target applet can be implemented, thereby improving convenience of an interaction process, and avoiding attention separation caused by unsustainable voice interaction which is due to the fact that the interaction with the applet needs to be performed in a touching manner, improving user experience of using the applet, and providing a strong support for distribution and usage of the applet in intelligent voice devices.

According to the embodiments of the present application, the present application further provides an electronic device and a readable storage medium.

Figure 9:
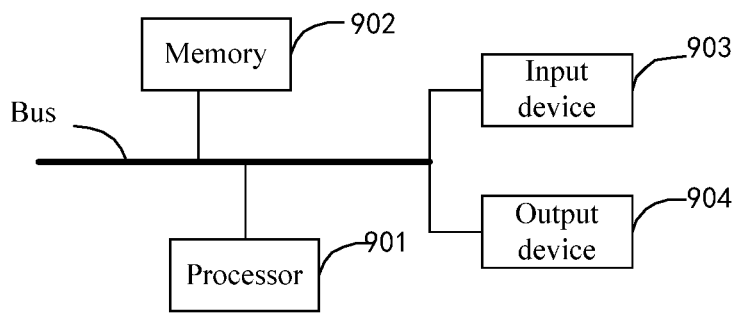
FIG. 9 is a block diagram of an electronic device used to implement the voice control method for applets in the embodiments of the present application.

As shown in FIG. 9, which is a block diagram of an electronic device of the voice control method for applets according to the embodiments of the present application. The electronic device is intended to represent various forms of digital computers, such as laptop computers, desktop computers, workstations, personal digital assistants, servers, blade servers, mainframe computers, and other suitable computers. Electronic devices can also represent various forms of mobile devices, such as personal digital processing, cellular phones, smart phones, wearable devices and other similar computing devices. Components shown herein, connections, relationships and functions thereof are merely examples, and are not intended to limit the implementation of the application described and/or claimed herein.

As shown in FIG. 9, the electronic device includes: one or more processors 901, a memory 902, and interfaces for connecting various components, including a high-speed interface and a low-speed interface. Respective components connect to each other by using different buses, and can be installed on a common mainboard or can be installed in other methods according to requests. The processor may process instructions executed in the electronic device, including instructions stored in or on the memory to display graphical information of GUI on an external input/output device, such as a display device coupled to an interface. In other embodiments, if needed, multiple processors and/or multiple buses may be used with multiple memories. Similarly, multiple electronic devices can be connected, and each device provides some necessary operations (for example, as a server array, a group of blade servers, or a multiprocessor system). One processor 901 is taken as an example in FIG. 9.

The processor 902 is a non-transitory computer-readable storage medium provided by the present application. The memory stores instructions executable by at least one processor, causing the at least one processor to execute the voice control method for applets provided by the present application. The non-transitory computer-readable storage medium stores a computer instruction, the computer instruction is used to cause a computer to execute the voice control method for applets provided by the present application.

As a non-transitory computer-readable storage medium, the memory 902 can be used to store non-transitory software programs, non-transitory computer-executable programs and modules, such as program instructions/modules corresponding to the voice control method for applets in the embodiments of the present application (for example, respective modules shown in FIG. 8). The processor 901 executes various functional applications and data processing of the server by running non-transitory software programs, instructions and modules stored in the memory 902, that is, implements the voice control method for applets in the above method embodiment.

The memory 902 may include a program storage area and a data storage area, where the program storage area may store an application program required by an operating system and at least one function; the data storage area may store data created according to the use of the electronic device of the voice control method for applets, etc. In addition, the memory 902 may include a high-speed random access memory, and may also include a non-transitory memory, such as at least one disk memory device, a flash memory device, or other non-transitory solid-state memory devices. In some embodiments, the memory 902 may optionally include memories remotely located with respect to the processor 901, and the remote memories may be connected to the electronic devices of the voice control method for applets through a network. Examples of the above networks include, but are not limited to, the Internet, an intranet, a local area network, a mobile communication network and combinations thereof.

The electronic device of the voice control method for applets may further include: an input device 903 and an output device 904. The processor 901, the memory 902, the input device 903 and the output device 904 can be connected through a bus or through other methods, being connected through a bus being taken an example in FIG. 9.

The input device 903 can receive inputted digital or character information, and generate key signal input related to user setting and function control of the electronic device of the voice control method for applets, such as a touch screen, a keypad, a mouse, a track pad, a touch pad, an indicator stick, one or more mouse buttons, a trackball, a joystick and other input devices. The output device 904 may include display devices, auxiliary lighting devices (e.g., LEDs), haptic feedback devices (e.g., vibration motors), and the like. The display device may include but is not limited to, a liquid crystal display (LCD), a light emitting diode (LED) display and a plasma display. In some embodiments, the display device can be a touch screen.

Various embodiments of systems and techniques described here may be implemented in digital electronic circuit systems, integrated circuit systems, ASIC (application specific integrated circuits), computer hardware, firmware, software, and/or combinations thereof. The various embodiments may include: being implemented in one or more computer programs that can be executed and/or interpreted on a programmable system including at least one programmable processor, the programmable processor can be a special or general programmable processor and can receive data and instructions from a storage system, at least one input device and at least one output device, and transmit the data and instructions to the storage system, the at least one input device, and the at least one output device.

The computer programs (also called programs, software, software applications, or codes) include machine instructions of programmable processors, and can be implemented by using high-level procedures and/or object-oriented programming languages, and/or assembly/machine languages. As used herein, terms "machine-readable medium" and "computer-readable medium" refer to any computer program products, devices, and/or apparatuses (e.g., a magnetic disk, an optical disk, a memory, a programmable logic device (PLD)) used to provide machine instructions and/or data to a programmable processor, including a machine-readable medium that receives machine instructions as machine-readable signals. A term "machine-readable signal" refers to any signal used to provide machine instructions and/or data to a programmable processor.

To provide interactions with the user, the systems and techniques described here can be implemented on a computer, the computer having: a display device (e.g., a CRT (cathode ray tube) or an LCD (liquid crystal display) monitor) configured to display information to the user; and a keyboard and a pointing device (e.g., a mouse or a trackball) through which the user can provide input to the computer. Other kinds of devices can also be configured to provide interactions with the user; for example, feedbacks provided to the user can be any form of sensory feedback (for example, visual feedbacks, auditory feedbacks, or haptic feedbacks); and inputs from the user can be received in any form, including sound input, voice input or haptic input.

The systems and technologies described herein can be implemented in a computing system including background components (e.g., as a data server), or a computing system including middleware components (e.g., an application server), or a computing system including front-end components (e.g., a user computer with a graphical user interface or a web browser through which the user can interact with embodiments of the systems and technologies described here), or a computing system including any combination of the background components, the middleware components, or the front-end components. Components of the system can be connected to each other through digital data communication (e.g., communication network) in any form or medium. Examples of communication networks include a local area network (LAN), a wide area networks (WAN), and the Internet.

A computer system may include a client and a server. Clients and servers are generally remote from each other and usually interact through communication networks. A relationship between the client and the server can be generated by executing a computer program having a client-server relationship to each other on a corresponding computer.

According to technical solutions provided by the embodiment of the present application, a voice control instruction for a target applet in an intelligent voice device from a user is acquired through a voice collecting device; voice recognition and intention analysis are performed by the voice interaction system on the voice control instruction to acquire intention information, and the intention information is transmitted to the target applet; the intention information is received and converted into a control instruction executable by a thread of the target applet by the target applet, and the control instruction is executed by the thread of the target applet. According to the present embodiment, through interactions between the voice interaction system and a target applet framework, voice control to the target applet can be implemented, thereby improving convenience of an interaction process, and avoiding attention separation caused by unsustainable voice interaction which is due to the fact that the interaction with the applet needs to be performed in a touching manner, improving user experience of using the applet, and providing a strong support for distribution and usage of the applet in intelligent voice devices.

It should be understand that, various forms of procedures shown above can be used to rearrange, add or delete steps. For example, respective steps recorded in the present application can be executed parallelly, in sequence, or in different orders, as long an expected result of the technical solutions disclosed in the present application can be implemented.

The above-mentioned embodiments do not constitute limitations to a protection scope of the present application. It should be understood by those of ordinary skills in the art that, various modifications, combinations, sub-combinations and substitutions can be performed according to design requests and other factors. Any modification, equivalent substitution and improvement in a spirit and principle of the present application shall all be included in the protection scope of the present application.

What is claimed is:

1. A voice control method for applets, applied to an intelligent voice device, wherein the intelligent voice device is configured with a voice interaction system and a target applet, and the method comprises:
   receiving, by the target applet, intention information transmitted by the voice interaction system, wherein the intention information is obtained after the voice interaction system performs voice recognition and intention analysis on a voice control instruction for the target applet sent by a user; and
   converting, by the target applet, the intention information into a control instruction executable by a thread of the target applet, and executing, by the thread of the target applet, the control instruction;
   wherein before the voice interaction system performs voice recognition and intention analysis on a voice control instruction for the target applet sent by a user, the voice interaction system acquires a voice calling up instruction for the target applet sent by the user, performs voice recognition and intention analysis on the voice calling up instruction, determines the target applet to be called up according to an intention analysis result, searches whether a target resource corresponding to the resource information exists in a resource pool of the target applet if determining that the intention analysis result comprises the target applet to be called up and resource information requested by the user, acquires a further applet that is capable of providing the target resource and recommends the further applet to the user as an alternative target applet if the target resource does not exist, and calls up the target applet.

2. The method according to claim 1, wherein the intention information is intention information generated by the voice interaction system in accordance with a preset protocol according to an intention analysis result;
   the converting, by the target applet, the intention information into a control instruction executable by a thread of the target applet comprises:
   determining, by the target applet, a preset converting rule according to the intention information, and converting the intention information into the control instruction executable by the thread of the target applet according to the preset converting rule.

3. The method according to claim 2, wherein the preset protocol comprises a protocol header and content of the protocol, and the content of the protocol comprises operation information corresponding to intention and target applet information;
- the determining, by the target applet, a preset converting rule according to the intention information, and converting the intention information into the control instruction executable by the thread of the target applet according to the preset converting rule comprises:
- acquiring, by the target applet, a preset conversion rule corresponding to the protocol header according to the protocol header in the intention information, wherein the preset conversion rule comprises a corresponding relationship between preset operation information and a preset control instruction; and
- converting, by the target applet according to the corresponding relationship between the preset operation information and the preset control instruction, the content of the protocol in the intention information into the control instruction executable by the thread of the target applet.

4. The method according to claim 1, wherein the executing, by the thread of the target applet, the control instruction, comprises:
- if the target applet determines that the control instruction requires an interaction with a server, controlling, by the target applet, the thread of the target applet to temporarily and locally store related content that requires to be interacted, and uploading the related content that requires to be interacted to the server in an asynchronous uploading mode.

5. The method according to claim 1, wherein before the receiving, by the target applet, intention information transmitted by the voice interaction system, the method further comprises:
- calling up, by the voice interaction system, the target applet according to a voice calling up instruction for the target applet sent by the user.

6. The method according to claim 1, wherein the intelligent voice device is an intelligent speaker.

7. A voice control method for applets, applied to an intelligent voice device, wherein the intelligent voice device is configured with a voice interaction system and a target applet, and the method comprises:
- acquiring, by the voice interaction system, a voice control instruction for the target applet sent by a user;
- performing, by the voice interaction system, voice recognition and intention analysis on the voice control instruction to acquire intention information; and
- transmitting, by the voice interaction system, the intention information to the target applet, to enable the target applet to convert the intention information into a control instruction executable by a thread of the target applet, and execute the control instruction;. wherein before the acquiring, by the voice interaction system, a voice control instruction for the target applet sent by the user, the method further comprises:
- acquiring, by the voice interaction system, a voice calling up instruction for the target applet sent by the user; and
- performing, by the voice interaction system, voice recognition and intention analysis on the voice calling up instruction, determining the target applet to be called up according to an intention analysis result, and calling up the target applet;
- wherein the determining the target applet to be called up according to an intention analysis result comprises:
- if determining that the intention analysis result comprises the target applet to be called up and resource information requested by the user, searching, by the voice interaction system, whether a target resource corresponding to the resource information exists in a resource pool of the target applet; and
- if the target resource does not exist, acquiring a further applet that is capable of providing the target resource and recommending the further applet to the user as an alternative target applet.

8. The method according to claim 7, wherein the acquiring the intention information comprises:
- generating, by the voice interaction system, the intention information in accordance with a preset protocol according to an intention analysis result, wherein the preset protocol comprises a protocol header and content of the protocol, and the content of the protocol comprises operation information corresponding to the intention and target applet information.

9. The method according to claim 7, wherein the calling up the target applet comprises:
- if the voice interaction system determines that the target applet does not exist in the intelligent voice device, acquiring an applet package of the target applet from a server, and calling up the target applet; or,
- if the voice interaction system determines that the target applet already exists in the intelligent voice device, directly calling up the target applet.

10. The method according to claim 9, wherein the acquiring an applet package of the target applet from a server comprises:
- if the voice interaction system determines that the intelligent voice device supports a voice interaction with an applet, acquiring a full applet package of the target applet from the server; or,
- if the voice interaction system determines that the intelligent voice device does not support voice interaction with an applet, acquiring a partial applet package of the target applet from the server, wherein the partial applet package does not load a module related to the voice interaction.

11. The method according to claim 9, further comprising:
- periodically acquiring, by the voice interaction system, a predetermined number of applet packages of popular applets from the server and caching the apple packages.

12. The method according to claim 7, wherein the intelligent voice device is an intelligent speaker.

13. A voice control method for applets, applied to an intelligent voice device, wherein the intelligent voice device is configured with a voice interaction system and a target applet, and the method comprises:
- acquiring, through a voice collecting device, a voice control instruction for the target applet from a user;
- performing, by the voice interaction system, voice recognition and intention analysis on the voice control instruction to acquire intention information, and transmitting the intention information to the target applet; and
- receiving, by the target applet, the intention information, and converting the intention information into a control instruction executable by a thread of the target applet, and executing, by the thread of the target applet, the control instruction;
- wherein before the performing, by the voice interaction system, voice recognition and intention analysis on the voice control instruction to acquire intention information, the method further comprises:

acquiring, by the voice interaction system, a voice calling up instruction for the target applet sent by the user; and performing, by the voice interaction system, voice recognition and intention analysis on the voice calling up instruction, determining the target applet to be called up according to an intention analysis result, and calling up the target applet;

wherein the determining the target applet to be called up according to an intention analysis result comprises:

if determining that the intention analysis result comprises the target applet to be called up and resource information requested by the user, searching, by the voice interaction system, whether a target resource corresponding to the resource information exists in a resource pool of the target applet; and if the target resource does not exist, acquiring a further applet that is capable of providing the target resource and recommending the further applet to the user as an alternative target applet.

14. The method according to claim 13, wherein before the acquiring, through a voice collecting device, a voice control instruction for the target applet from a user, the method further comprises:

acquiring, through the voice collecting device, a voice calling up instruction for the target applet from the user; and performing, by the voice interaction system, voice recognition and intention analysis on the voice calling up instruction, determining the target applet to be called up according to the intention analysis result, and calling up the target applet.

15. An electronic device, comprising:
at least one processor; and
a memory communicatively connected to the at least one processor; wherein,
the memory stores instructions executable by the at least one processor, and the instructions are executed by the at least one processor to cause the at least one processor to execute the method according to claim 1.

16. An electronic device, comprising:
at least one processor; and
a memory communicatively connected to the at least one processor; wherein,
the memory stores instructions executable by the at least one processor, and the instructions are executed by the at least one processor to cause the at least one processor to execute the method according to claim 7.

17. An electronic device, comprising:
at least one processor; and
a memory communicatively connected to the at least one processor; wherein,
the memory stores instructions executable by the at least one processor, and the instructions are executed by the at least one processor to cause the at least one processor to execute the method according to claim 13.

18. A non-transitory computer-readable storage medium storing computer instructions, the computer instructions being used to cause a computer to execute the method according to claim 1.

* * * * *